_United States Patent_ [19]

Haag et al.

[11] 3,875,252

[45] Apr. 1, 1975

[54] OXIDATIVE DEHYDROGENATION OF ORGANIC COMPOUNDS

[75] Inventors: Werner O. Haag; Joseph N. Miale, both of Trenton, N.J.

[73] Assignee: Mobil Oil Corporation, New York, N.Y.

[22] Filed: Jan. 2, 1974

[21] Appl. No.: 429,994

Related U.S. Application Data

[63] Continuation-in-part of Ser. No. 10,023, Feb. 7, 1970, Pat. No. 3,787,517.

[52] U.S. Cl. ...... 260/669 R, 260/465 K, 260/650 R
[51] Int. Cl. ..................... C07c 5/20, C07c 15/10
[58] Field of Search .............................. 260/669 R

[56] References Cited
UNITED STATES PATENTS
3,652,698   3/1972   Benslay et al.................. 260/669 R _Primary Examiner_—C. Davis
_Attorney, Agent, or Firm_—C. A. Huggett

[57] ABSTRACT

Alkyl aromatic compounds, such as ethylbenzene, are dehydrogenated by reaction with carbonyl sulfide in the vapor phase in the presence of either silica or a supported heavy metal catalyst, e.g., iron on an oxide carrier.

10 Claims, No Drawings

OXIDATIVE DEHYDROGENATION OF ORGANIC COMPOUNDS

RELATED APPLICATION

This application is a continuation-in-part of application Ser. No. 10,023, filed Feb. 7, 1970, now U.S. Pat. No. 3,787,517.

BACKGROUND OF THE INVENTION

This invention relates to a process for the dehydrogenation of alkyl aromatics. More specifically, this invention is directed to the catalytic vapor phase oxidative dehydrogenation of alkyl aromatic compounds by reaction with carbonyl sulfide in the presence of either silica or a supported heavy metal catalyst, e.g., iron on an oxide carrier.

The dehydrogenation of organic compounds for the production of compounds having a higher degree of unsaturation by oxidative dehydrogenation is generally well known. The process may be illustrated in connection with the stoichiometric reaction of a compound containing a paraffinic group with a hydrogen acceptor or oxidant in accordance with the general equation:

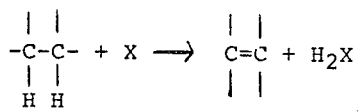

wherein X is the hydrogen acceptor or oxidant, to produce an olefinic group and a compound $H_2X$.

As the oxidant X, oxygen has been commonly employed, but in general, with resulting low selectivity. This also applies to the halogens, with the exception of iodine, which produces olefins in high yields. However, the corrosion problems and high cost of iodine have prevented commercialization so far.

The use of sulfur as a relatively available and cheap oxidant is well known, reacting at moderate temperatures of 400°-470°F. with paraffins to yield mostly sulfides and disulfides. At high temperatures paraffins with four or more carbon atoms yield thiophenes and the conversion of cyclohexane to aromatics with sulfur is an old, well-established laboratory procedure. The use of sulfur in the formation of styrene from ethyl benzene has been claimed in the recent patent to Schuman, U.S. Pat. No. 3,344,201, Sept. 26, 1967.

The use of sulfur dioxide as the oxidant in the conversion of paraffins ($C_6-C_{10}$) to aromatics has been reported by V. J. Frilette in *Chemie et Industrie*, 88, 487 (1962), with good yields over CaO and MgO as catalysts. The use of sulfur dioxide as the oxidant in the conversion of paraffins ($C_6-C_{10}$) to olefins and aromatics has also been reported by C. R. ADAMS, I & E C 61 30 (1969) with good yields over bismuth phosphotungstate, bismuth molybdate and calcium nickel phosphate as catalysts with selectivities for unsaturated hydrocarbons of 0–75%, thiophenes being a major product for paraffins having carbon chain-lengths greater than three. Adams obtained high selectivity with ethylbenzene but not with other alkyl-aromatics.

In a patent issued to Boswell, U.S. Pat. No. 3,399,243 Aug. 27, 1968, carbonyl sulfide, COS, is disclosed as an oxidant for the conversion of ethylbenzene to styrene. The reaction proceeds at acceptable rates of conversion per pass and in satisfactory yields over magnesia as a catalyst.

The U.S. Pat. No. 3,429,943 issued to Trevillyan et al. discloses conversion of paraffins to olefins by reacting them with carbonyl sulfide in the absence of catalyst. They used excess hydrocarbon and very long contact times. Conversion drops rapidly with contact time while adverse selectivity effects are incurred by increasing temperature to achieve higher conversion.

SUMMARY OF THE INVENTION

In accordance with the present invention, alkylaromatic compounds are dehydrogenated by reaction with carbonyl sulfide, COS, in the presence of either silica or a supported heavy metal catalyst, e.g., iron on an oxide carrier, to produce compounds having a higher degree of unsaturation than the starting material.

The process is applicable to a wide variety of alkylaromatic reactants wherein the aromatic compound has the formula:

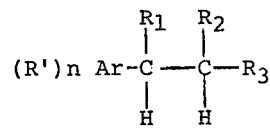

where Ar is an aryl or substituted aryl group (e.g., phenyl, naphthyl, thienyl $C_4H_3S$, pyridyl); $R_1$, $R_2$, $R_3$ are selected from H or lower alkyl ($C_1-C_4$); $R'$ is selected from the group consisting of lower alkyl ($C_1-C_4$), alkoxy, halogen, cyano, aromatic and mixtures thereof, and where n is 0-5.

Preferred are alkyl benzenes such as ethylbenzene and substituted ethylbenzenes of the generic formula:

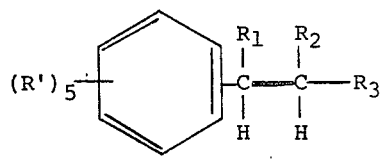

wherein $R_1$, $R_2$ and $R_3$ are hydrogen or lower alkyl ($C_1-C_4$); $R'$ is selected from the group consisting of hydrogen, lower alkyl ($C_1-C_4$), alkoxy, halogen, cyano, and mixtures thereof.

As indicated above, the alkyl-benzene compound reactant can contain one or more substituent groups on the benzene ring or on the side-chain. Non-limiting examples of the alkyl-aromatic compound reactant are ethylbenzene; butylbenzene; 4-methylisopropylbenzene; (3-methylbutyl)benzene; meta- and para-tertiarybutylethylbenzenes; 1-methyl-3-ethylbenzene; 1-methyl-4-ethylbenzene; propylbenzene; isopropylbenzene; isobutylbenzene; diethylbenzene; hexylbenzene; 3-chloro-ethylbenzene; 4-chloro-ethylbenzene (=1-chloro-4-ethylbenzene); 4-bromo-propylbenzene; p-methoxyethylbenzene (=1-methoxy-4-ethylbenzene); o-ethoxy-propylbenzene; 3,4-dichloroisopropylbenzene; 2-methyl-5-phenylethylbenzene; 5-cyanoethylbenzene; and 2,4,6-trimethylethylbenzene; 2-ethylthiophene; 1-methyl-4-isopropylthiophene; 2-propylpyridine; 4-isopentylpyridine; 2,7-diethylnapthalene; and 1-ethylnaphthalene. The ethylbenzenes, which can have a substituent or substituents $R'$ as aforedefined, are preferred alkyl aromatic compound reactants.

The carbonyl sulfide employed in the present process as the oxidant may be charged as such with the feed, or may be formed in situ, as by the addition of a mixture of carbon monoxide and sulfur, hydrogen sulfide and carbon monoxide, or of carbon dioxide and carbon disulfide. Throughout the present specification and claims, the term "carbonyl sulfide" is accordingly intended to be inclusive of carbonyl sulfide whether formed in situ in the reactor or formed as such prior to introduction into the reaction.

The catalysts employed in the present invention are of special importance and constitute a point of particular novelty. These catalysts are, in general, the (heavy) metals, Groups IB, Group IIB, and Groups III to Group VIII, e.g., the elements scandium, titanium, vanadium, chromium, molybdenum, manganese, iron, cobalt, nickel, cadmium, tin, antimony, and bismuth (including compounds thereof). Especially preferred catalysts are molybdenum, iron, cobalt, nickel and vanadium.

The catalysts are deposited on support or carrier material which is selected from a large class of known catalyst supports which are generally difficultly reducible oxides such as alumina, silica, boria, magnesia and silica-alumina. The metal catalyst may be deposited on the catalyst support material by any of the well known methods employed in this art, e.g., by impregnation, evaporation from a solution, etc. The preferred carrier is silica.

Although the preferred catalyst is a heavy metal, deposited on a silica carrier, it has been unexpectedly found that silica, alone, may be used as a catalyst. As shown hereinafter, pure silica, substantially free of impurities, is about 10% more selective and productive than a commercial silica containing trace amounts of alumina. Addition of a heavy metal such as iron to silica improves substantially the rate of reaction which leads to increased productivity.

The catalysts are most commonly prepared from compounds of heavy metals, including their oxides, sulfides, hydroxides, silicates, citrates, sulfates, as well as mixtures thereof.

An especially preferred catalyst system has been found to be iron, prepared from ferric ammonium citrate deposited on a pure form of silica, such as silica gel prepared from ethyl-orthosilicate, which has been activated by treatment with hydrogen sulfide before use.

While as pointed out above, the oxidative dehydrogenation reaction using carbonyl sulfide as oxidant is in stoichiometric proportions, the molar ratios of the oxidant to the organic feed material may vary from 0.2 to 10. However, the preferred range of ratios has been found to be from 1 to 5. The reaction may be carried out under pressures of 1 to 5 atmospheres although one atmosphere is usually preferred.

It is contemplated that the process of the invention can be carried out batchwise, but it is more feasible to use a continuous operation.

The liquid hourly space velocity (LHSV-liquid volume compound charged per volume of catalyst per hour) may be between 0.05 to 40, preferably 1 to 10 and is correlative with the temperature. The temperature employed can be between 300°C. and about 700°C., although a preferred range is between about 500°C. and 600°C.

The invention will be further understood by reference to the following examples which illustrate the best mode now contemplated for carrying out the invention.

EXAMPLE I

The conversion of ethylbenzene to styrene was carried out using carbonyl sulfide as oxidant over a silica supported iron catalyst prepared from ferric ammonium citrate deposited by impregnation on pure silica gel and activated by treatment with hydrogen sulfide. At atmospheric pressure and with a feed stock molar ratio of COS to ethylbenzene of 4.45, the results obtained at temperatures of 538°C. and 593°C. and at varying space velocities are tabulated below:

TABLE I

| Catalyst | Temperature °C | LHSV | %Conversion | %Selectivity |
|---|---|---|---|---|
| Fe/SiO$_2$ | 538 | 0.5 | 92 | 97 |
| | 538 | 1.0 | 92 | 98 |
| | 538 | 2.0 | 74 | 99 |
| | 593 | 8.0 | 68 | 98 |

EXAMPLE 2

The conversion of ethylbenzene to styrene was carried out as in Example 1, but substituting for the catalyst system cobalt as the catalyst deposited on silica. At a temperature of 538°C. and molar proportions of COS : ethylbenzene of 4.5, the following results were obtained:

TABLE II

| LHSV | % Conversion | % Selectivity |
|---|---|---|
| 3.0 | 53 | 99 |
| 6.0 | 55 | 99 |

EXAMPLE 3

The conversion of ethylbenzene to styrene was carried out as in Example 1, but substituting nickel as the catalyst deposited on silica. At a temperature of 538°C. and LHSV of 3.0, the percent conversion was 73% and selectivity of 98%.

EXAMPLE 4

The reaction as carried out in Example 3 was repeated but with vanadium as the catalyst supported on silica. This resulted in conversion of 84% and percent selectivity of 99%.

EXAMPLES 5-11

Conversion of ethylbenzene was carried out as in Example 1, but substituting the following catalysts: copper on silica, cadmium on silica, molybdenum on silica, iron on magnesia, cerium on silica, bismuth on silica, all prepared from deposition of concentrated salt solutions by the basic method used in Example 1 and antimony on magnesia prepared by ballmilling equal amounts of antimony sulfide ($Sb_2S_3$) and magnesia followed by calcination and hydrogen sulfide treatment prior to use.

| EX. | CATALYST | °C | LHSV | CON-VERSION | SELEC-TIVITY |
|---|---|---|---|---|---|
| 5 | Copper/silica | 538 | 1.5 | 40% | 98% |
| 6 | Cadmium/silica | 538 | 3.0 | 51 | 99+ |
| 7 | Molybdenum/silica | 538 | 3.0 | 91 | 99+ |
|   |   |   | 6.0 | 60 | 99+ |
| 8 | Iron/magnesia | 538 | 3.0 | 54 | 98 |
| 9 | Cerium/silica | 538 | 3.0 | 69 | 99+ |
|   |   |   | 5.0 | 54 | 99+ |
| 10 | Bismuth/silica | 538 | 3.0 | 60 | 98 |
|   |   |   | 0.75 | 75 | 98 |
| 11 | Antimony/magnesia | 538 | 3.0 | 45 |   |
|   |   |   | 0.75 | 79 | 99+ |
|   |   |   | 3.0 | 82 |   |
|   |   | 593 | 12.0 | 36 | 99+ |

EXAMPLE 12

A series of experiments were carried out wherein the conversion of ethylbenzene to styrene was evaluated with the catalysts of the instant invention and compared with the preferred magnesia catalyst of Boswell, U.S. Pat. No. 3,399,243. The reaction conditions included a mole ratio of COS to ethylbenzene of 4.5 to 1 and atmospheric pressure. The addition of a heavy metal such as iron to magnesia improves the rate of reaction (productivity of the catalyst) as shown in the following table:

TABLE III

Conversion of Ethylbenzene to Styrene

| Catalyst | MgO | Fe/MgO | MgO | Fe/MgO |
|---|---|---|---|---|
| °F | 1000 | 1000 | 1100 | 1100 |
| LHSV | 0.5 | 3.0 | 0.5 | 3.0 |
| Contact Time, Sec. | 6.7 | 1.1 | 6.7 | 1.1 |
| % Yield of Styrene | 77.0 | 53.7 | 78.2 | 70.7 |
| Wt. % Conversion | 78.5 | 54.6 | 80.8 | 73.7 |
| % selectivity | 98.1 | 98.0 | 96.8 | 95.9 |
| Rate[a] | 0.24 | 1.21 | 0.24 | 1.67 |

[a] g styrene produced per hour per g catalyst

EXAMPLES 13 - 14

A series of experiments were carried for the conversion of t-butylethylbenzene to t-butylstyrene using the catalysts of the invention. The silica supported iron catalyst was prepared according to Example 1 whereas molybdenum on silica was prepared according to Example 7. The experimental conditions and results obtained are set forth below in Table IV.

EXAMPLE 15

Conversion of ethylbenzene to styrene was carried out using carbonyl sulfide as the oxidant on an aliquot of pure silica gel prepared from ethyl orthosilicate which had a surface area of 436 m²/g(B.E.T.). The catalyst was calcined at 538°C prior to use. At atmospheric pressure, 0.5 LHSV, and with a feedstock molar ratio of COS to ethylbenzene of 4.45, the following results were obtained:

| Temperature | Conversion | Selectivity |
|---|---|---|
| 538°C | 50% | 99% |
| 593 | 82 | 96 |

TABLE IV

| Catalyst[1] | Temp. °F. | LHSV | Mol Ratio COS/t-butylethyl-benzene | Contact Time (sec) | Run Time (Hrs.) | Yields, Wt.% t-Butyl-styrene | Yields, Wt.% Other | Selec-tivity[2] | Productiv-ity[3] |
|---|---|---|---|---|---|---|---|---|---|
| MO/SiO₂ | 1000 | 3.0 | 1.5 | .067 | 1 | 42.5 | 5.5 | 88.5 | 1.07 |
|  | " | 1.5 | 3.0 | .083 | 2 | 52.9 | 10.2 | 83.8 | .67 |
|  | " | " | " | " | 3 | 55.1 | 6.8 | 89.0 | .70 |
|  | " | " | " | " | 4 | 35.1 | 1.9 | 94.9 | .44 |
|  | 1055 | " | " | " | 6 | 15.9 | 1.0 | 94.1 | .20 |
|  | " | " | " | " | 7 | 14.9 | 0.4 | 97.4 | .19 |
| Fe/SiO₂ | 1000 | 3.0 | 1.5 | .067 | 1 | 51.0 | 3.3 | 93.9 | 1.29 |
|  | " | " | " | " | 2 | 30.1 | 3.6 | 89.3 | .76 |
|  | " | 1.5 | 3.0 | .083 | 3 | 29.8 | 0.8 | 97.4 | .38 |
|  | " | " | 4.5 | .061 | 4 | 33.5 | 0.5 | 98.5 | .42 |
| Regen.[4] | 1000 | 1.0 | 4.5 | .091 | 1 | 68.2 | 4.9 | 93.2 | .58 |
|  |  | 2.0 | 4.5 | .045 | 1.5 | 42.2 | 1.3 | 97.0 | .71 |

[1] Catalyst (2ml) sulfided 30 min H₂S at 60 ml/min, 1000°F
[2] Selectivity=t-Butylstyrene/Total Converted Products
[3] Productivity=t-Butylstyrene, grams per hour per gram catalyst
[4] Regeneration 3 hrs/1000°F in air (not complete) + 50 min. H₂S treat

EXAMPLE 16

In Table V below the addition of a heavy metal such as iron to silica increases the efficiency by a factor of about 2, without loss of selectivity, for converting ethylbenzene to styrene at high conversion (about 92%). As also shown, pure silica is about 10% more selective and productive than commercial silica which is mildly acidic due to traces of alumina. The reaction conditions include a mole ratio of COS to ethylbenzene of 4.5 to 1 at atmospheric pressure.

TABLE V

| CATALYSTS | °F | LHSV | Contact Time,Sec. | % Yield of Styrene | Wt.% Conversion | % Selectivity | Rate[a] |
|---|---|---|---|---|---|---|---|
| SiO₂ (commercial) vs sulfided Fe/SiO₂ (commercial) | | | | | | | |
| SiO₂ | 1000 | 0.5 | 6.7 | 35.9 | 39.0 | 91 | .28 |
| Fe/SiO₂ |  |  |  | 88.4 | 9.18 | 96.3 | .56 |
| Commercial vs Organically derived pure SiO₂ | | | | | | | |
| Comm.SiO₂ | 1000 | 0.5 | 6.7 | 35.9 | 39.0 | 91 | .28 |
| Pure SiO₂ |  |  |  | 39.0 | 39.4 | 99+ | .31 |

[a] g styrene produced per hour per g catalyst

EXAMPLE 17

In order to test the general utility of the oxidative dehydrogenation with carbonyl sulfide, a variety of alkyl aromatic compounds were dehydrogenated to the corresponding unsaturated compounds. The selectivity exceeded 95% in all cases. The experimental conditions were: 1000°F, hydrocarbon liquid flow rate 6 ml per hour, carbonyl sulfide gas flow rate 90 ml per minute (mole rate COS/hydrocarbon = 4.5); the catalyst was 2 ml of pure silica, derived from ethylorthosilicate as prepared in Example 15. The results are shown in the table:

| Feed | Product | Relative Rates of Conversion |
|---|---|---|
| Ethylbenzene | Styrene | 1.0 |
| n-Propylbenzene | β-Methylstyrene | 1.0 |
| Isopropylbenzene | α-Methylstyrene | 4.8 |
| Isobutylbenzene | β,β-Dimethylstyrene | 1.6 |
| 1-Methyl-3-ethylbenzene | m-Methylstyrene | 1.2 |
| 1-Methyl-4-ethylbenzene | p-Methylstyrene | 1.5 |
| 1-Methoxy-4-ethylbenzene | p-Methoxystyrene | 1.1 |
| 1-Chloro-4-ethylbenzene | p-Chlorostyrene | 1.05 |
| 1-Bromo-4-ethylbenzene | p-Bromostyrene | 0.76 |

The data indicate that ethylbenzenes having substituents on the side chain or on the aromatic nucleus can be converted to the corresponding styrene derivatives under conditions similar to those for ethylbenzene itself. The substituents can be alkyl groups or other functional groups such as methoxy, or halogens such as chloro or bromo groups.

What is claimed is:

1. A process for the catalytic oxidative dehydrogenation of an alkyl aromatic hydrocarbon to produce compounds having a higher degree of unsaturation which comprises contacting said aromatic hydrocarbon and carbonyl sulfide with a catalyst consisting of a heavy metal deposited on an oxide carrier, said aromatic having the formula:

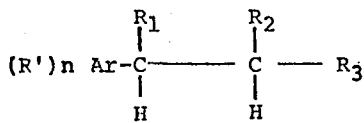

where Ar is an aryl or substituted aryl group; $R_1$, $R_2$, $R_3$ are selected from H or lower alkyl ($C_1$–$C_4$); R' is selected from the group consisting of lower alkyl ($C_1$–$C_4$), alkoxy, halogen, cyano, aromatic and mixtures thereof, and where $n$ is 0–5.

2. The process of claim 1 wherein the aromatic hydrocarbon is an alkyl benzene having the formula:

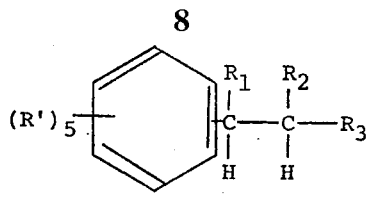

wherein $R_1$, $R_2$ and $R_3$ are hydrogen or lower alkyl; and R' is selected from the group consisting of hydrogen, lower alkyl, alkoxy, halogen, cyano, and mixtures thereof.

3. The process of claim 2 wherein the alkyl benzene is ethylbenzene.

4. The process of claim 2 wherein the alkyl benzene is t-butylethylbenzene.

5. The process of claim 3 wherein the catalyst is a silica supported iron compound.

6. The process of claim 4 wherein the catalyst is a silica supported iron compound.

7. A process for the catalytic oxidative dehydrogenation of an alkyl aromatic hydrocarbon to produce compounds having a higher degree of unsaturation which comprises contacting said aromatic hydrocarbon and carbonyl sulfide with a catalyst consisting of silica, said aromatic having the formula:

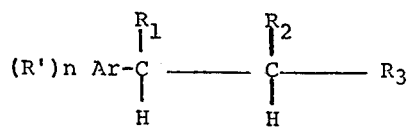

where Ar is an aryl or substituted aryl group; $R_1$, $R_2$, $R_3$ are selected from H or lower alkyl ($C_1$–$C_4$); R' is selected from the group consisting of lower alkyl ($C_1$–$C_4$), alkoxy, halogen, cyano, aromatic and mixtures thereof, and where $n$ is 0–5.

8. The process of claim 7 wherein the aromatic hydrocarbon is an alkyl benzene having the formula:

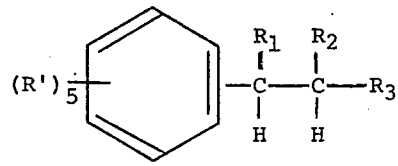

wherein $R_1$, $R_2$ and $R_3$ are hydrogen or lower alkyl; and R' is selected from the group consisting of hydrogen, lower alkyl, alkoxy, halogen, cyano, and mixtures thereof.

9. The process of claim 8 wherein the alkyl benzene is ethylbenzene.

10. The process of claim 8 wherein the alkyl benzene is t-butylethylbenzene.

* * * * *